United States Patent [19]

Henry

[11] Patent Number: 4,814,363

[45] Date of Patent: Mar. 21, 1989

[54] PHENOLIC RESIN COMPOSITIONS AND THEIR USE IN FOUNDRY BINDERS

[75] Inventor: Colleen M. Henry, Dublin, Ohio

[73] Assignee: Ashland Oil, Inc., Russell, Ky.

[21] Appl. No.: 144,845

[22] Filed: Jan. 15, 1988

[51] Int. Cl.$^4$ ............................ C08K 5/10; C08K 3/34
[52] U.S. Cl. .................................. 523/143; 523/145; 524/317
[58] Field of Search ................. 523/143, 145; 524/317

[56] References Cited

U.S. PATENT DOCUMENTS

| | | | |
|---|---|---|---|
| 3,409,579 | 11/1968 | Robins | 260/30.4 |
| 3,485,797 | 12/1979 | Robins | 260/57 |
| 3,676,392 | 11/1972 | Robins | 260/38 |
| 4,698,377 | 10/1987 | Laitar | 523/143 |

Primary Examiner—Lewis T. Jacobs
Attorney, Agent, or Firm—David L. Hedden

[57] ABSTRACT

This invention relates to phenolic resin compositions containing propylene glycol mono methyl ether acetate as a solvent. It also relates to the use of these compositions in foundry binders.

14 Claims, No Drawings

PHENOLIC RESIN COMPOSITIONS AND THEIR USE IN FOUNDRY BINDERS

TECHNICAL FIELD

This invention relates to phenolic resin compositions comprising a phenolic resin and propylene glycol mono methyl ether acetate. The phenolic resin compositions are used for preparing polyurethane binders. These binders are used for forming foundry mixes which are used for preparing foundry shapes. The foundry shapes are used for preparing metal castings.

BACKGROUND OF THE INVENTION

It is well known to prepare polyurethane foundry binders by reacting a phenolic resin and an organic polyisocyanate in the presence of a urethane promoting catalyst. See for example U.S. Pat. Nos. 3,485,797; 3,676,392; and 3,409,579. These patents and others clearly indicate that various solvents must be used in order to facilitate the mixing of the components and the reaction between the phenolic resin and organic polyisocyanate.

In particular, U.S. Pat. No. 3,676,392 relates to a no-bake process for preparing foundry shapes wherein a liquid urethane promoting catalyst is used to facilitate the reaction between the phenolic resin and organic polyisocyanate. This patent discloses that butyl cellosolve (butyl acetate) and cellosolve acetate (ethylene glycol mono methyl ether acetate) can be used as solvents with appropriate co-solvents for the phenolic resin.

SUMMARY OF THE INVENTION

This invention relates to phenolic resin compositions comprising:
a. a phenolic resin; and
b. a solvent composition comprising:
  i. propylene glycol mono methyl ether acetate; and
  ii an aromatic hydrocarbon.

Preferably, the weight percent of the phenolic resin in the phenolic resin composition is from 47 to 51 weight percent based Express Mail No. B 26633991 upon the total weight of the phenolic resin composition, most preferably from 45 to 50 weight percent.

The phenolic resin compositions are used to prepare polyurethane foundry binders which are used to make foundry mixes. The foundry mixes are used to make foundry shapes which are used to make metal castings.

The phenolic resin compositions are particularly useful for making foundry shapes by the no-bake process using a liquid urethane promoting catalyst. It has been found that the strengths of the foundry shapes are improved if phenolic resin compositions containing propylene glycol mono methyl ether acetate having lower solids (45 to 55 weight percent based upon the total weight of the phenolic resin compositions) are used in a no-bake process instead of phenolic resin compositions containing cellosolve acetate. This is an advantage because the preparation of metal castings from foundry shapes made with the subject phenolic resin compositions having low solids content will result in the production of low smoke, and low lustrous carbon in the casting.

All of these results are advantageous. Smoke obviously is to be reduced when possible. Lustrous carbon is to be reduced if possible because it results in casting defects which cost time and money to eliminate.

DESCRIPTION OF BEST MODE AND OTHER MODES FOR PRACTICING THE INVENTION

The phenolic resin compositions comprise a phenolic resin and a solvent component comprising propylene glycol mono methyl ether acetate (hereinafter referred to as PGMA acetate), and an aromatic hydrocarbon solvent.

The phenolic resins used in the phenolic resin compositions are well known in the foundry art. Suitable phenolic resins are those which are soluble in the solvents employed, such as phenolic resole or phenolic novolak resins formed by reacting phenolic compounds with aldehydes. Resole or A-stage resins, as well as resitol or B-stage resins, may be made by reacting a molar excess of aldehyde, such as formaldehyde, with a phenolic material in the presence divalent metal ion catalysts. The novolak resins may be formed by reacting a molar excess of phenolic material with an aldehyde in the presence of an acid catalyst.

The preferred phenolic resins used to form the subject binder compositions are well known in the art. Such resins are specifically described in U.S. Pat. No. 3,485,797 which is hereby incorporated by reference.

These resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1.0:1.0, preferably from 1.1:1.0 to 2.0:1.0 in the presence of a divalent metal ion catalyst, preferably a divalent metal ion such as zinc, lead, manganese, copper, tin, magnesium, cobalt, calcium, and barium.

The phenols may be represented by the following structural formula:

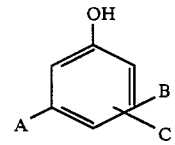

wherein A, B, and C are hydrogen atoms, or hydroxyl radicals, or hydrocarbon radicals or oxyhydrocarbon radicals, or halogen atoms, or combinations of these. The phenol may be a multiple ring phenol such as bisphenol A.

The phenolic resin is preferably non-aqueous. By "non-aqueous" is meant a phenolic resin which contains water in amounts of no more than about 10%, preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms.

By "phenolic resin" is meant the reaction product of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents, and/or other ingredients present, and so forth). The reaction products, that is the phenolic resin, will be a mixture of different molecules and may contain in widely varying ratios addition products, condensation products, and unreacted reactants such as unreacted phenol and/or unreacted aldehyde.

By "addition product" is meant reaction products in which an organic group has been substituted for at least one hydrogen of a previously unreacted phenol or of a condensation product.

By "condensation product" is meant reaction products that link two or more aromatic rings.

The phenolic resins are preferably substantially free of water and are organic solvent soluble. The phenolic component includes any one or more of the phenols which have heretofore been employed in the formation of phenolic resins and which are not substituted at both ortho-positions or at one ortho-position and the para-position. It has been found that substitution in these positions interfere with the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable.

The phenol reactant is preferably reacted with an aldehyde to form phenolic resins and more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resin used must be liquid or organic solvent-suitable. Solubility in an organic solvent is desirable to achieve uniform distribution of the binder on the aggregate.

The substantial absence of water in the phenolic resin is desirable in view of the reactivity of the binder composition of the present invention with isocyanates. Mixtures of phenolic resins can be used.

It is also possible to use phenolic resins as described herein which are modified with lower alkyl alcohols having from 1 to 8 carbon atoms such as methanol, n-butanol, ethanol, and the like. By methods well known in the art it is possible to modify the phenolic resin by adding the alcohol to the phenol and formaldehyde during the reaction, or reacting the alcohol with the phenolic resin after the resin has formed.

The solvent system for the phenolic resin comprises propylene glycol mono methyl ether acetate (PGMA) and an aromatic hydrocarbon co-solvent. Propylene glycol mono methyl ether acetate shall be construed to include any isomers associated with this compound. An aromatic hydrocarbon co-solvent is used with PGMA acetate. Although the weight percent of PGMA acetate and the co-solvent can vary, generally the weight ratio of PGMA acetate to the co-solvent is from 1:4 to 4:1, preferably from 2:1 to 1:2. Examples of aromatic hydrocarbon co-solvents which can be used include benzene, toluene, xylene, ethylbenzene, and mixtures thereof. Preferred aromatic solvents are mixed solvents that have an aromatic content of at least 90% and a boiling point of 138° C. to 232° C. Preferably used is HI-SOL 15, an aromatic solvent. The weight ratio of phenolic resin to solvent system in the phenolic resin compositions is from 45:55 to 55:45, preferably from 47:53 to 51:49.

The phenolic resin compositions are reacted with polyisocyanate composition in the presence of a urethane-promoting catalyst to form polyurethane binders which can be used in foundry applications.

The polyisocyanate compositions used to prepare foundry binders from the phenolic resin composition are those typically shown in the foundry art as being used with phenolic resins. The polyisocyanate compositions generally comprises an organic polyisocyanate and a solvent.

Generally, an organic polyisocyanate having a functionality of two or more, preferably at least 2.7, is used. It may be aliphatic, cycloaliphatic, aromatic, or a hybrid polyisocyanate. Mixtures of such polyisocyanates may be used. Also, it is contemplated that prepolymers and quasiprepolymers of polyisocyanates can be used. These are formed by reacting excess polyisocyanate with compounds having two or more active hydrogen atoms, as determined by the Zerewitinoff method. Optional ingredients such as release agents may also be used in the polyisocyanate component.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the phenolic resin when reacted with the curing catalyst. In general the isocyanate ratio of the polyisocyanate to the hydroxyl of the phenolic resin is from 1.25:1 to 1:1.25, preferably about 1:1. Expressed as weight percent, the amount of polyisocyanate used is from 10 to 500 weight percent, preferably 20 to 300 weight percent, based on the weight of the phenolic resin.

The polyisocyanate is used in a liquid form. Solid or viscous polyisocyanate must be used in the form of organic solvent solutions, the solvent generally being present in a range of up to 80 percent by weight of the solution.

Those skilled in the art will know how to select specific solvents for the polyisocyanate composition. It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanate. Aromatic solvents, although compatible with the polyisocyanate, are less compatible with the phenolic results. It is, therefore, preferred to employ combinations of solvents and particularly combinations of aromatic and polar solvents in the polyisocyanate component. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and Texanol.

The binder compositions are preferably made available as a two-package system with the phenolic resin in one package and the isocyanate component in the other package. Usually, the binder components are combined and then admixed with sand or a similar aggregate to form a foundry mix or the mix can also be formed by sequentially admixing the components with the aggregate. Methods of distributing the binder on the aggregate particles are well-known to those skilled in the art. The mix can, optionally, contain other ingredients such as iron oxide, ground flax fibers, wood cereals, pitch, refractory flours, and the like.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes", as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 0.1 mm. The aggregate for foundry shapes preferably has an average particle size between about 0.1 mm and about 0.25 mm. The preferred aggregate employed for ordinary foundry shapes is sand wherein at least about 70 weight percent and preferably at least about 85 weight percent of the sand is silica. Other suitable aggregate materials include zircon, olivine, aluminosilicate, chromite, and the like.

When preparing a shape for precision casting, the predominant portion and generally at least about 80% of the aggregate has an average particle size no larger than 0.1 mm and preferably between about 0.04 mm and 0.075 mm. Preferably at least about 90% by weight of the aggregate for precision casting applications has a particle size no larger than 0.1 mm and preferably between 0.04 mm and 0.075 mm. The preferred aggregates employed for precision casting applications are fused quartz, zircon, magnesium silicate, olivine, and aluminosilicate.

When preparing a refactory such as a ceramic the predominant portion and at least 80 weight percent of the aggregate employed has an average particle size under 0.075 mm and preferably no smaller than 0.04 mm. Preferably at least about 90% by weight of the aggregate for a refractory has an average particle size under 0.075 mm and preferably no smaller than 0.04 mm. The aggregate employed in the preparation of refractories must be capable of withstanding the curing temperatures such as above about 815° C. which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and ceramic.

Examples of some abrasive grains for preparing abrasive articles include aluminum oxide, silicon carbide, boron carbide, corundum, garnet, emery, and mixtures thereof. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 0.075 mm. It is most preferred that at least about 95% of the inorganic filler has an average particle size no greater than 0.075 mm. Some inorganic fillers include cryolite, fluorospar, silica, and the like. When an inorganic filler is employed along with the abrasive grit, it is generally present in amounts from about 1% to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

The aggregate constitutes the major constituent and the binder constitutes a relatively minor amount of the foundry mix. In ordinary sand-type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

In molds and cores for precision casting applications the amount of binder is generally no greater than about 40% by weight and frequently within the range of about 5% to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the sand can be tolerated. This is particularly true if the solvent employed is non-water-miscible or if an excess of the polyisocyanate necessary for curing is employed since such excess polyisocyanate will react with the water.

It will be apparent to those skilled in the art that other additives such as silanes, silicones, benchlife extenders, release agents, solvents, etc. can be added to the phenolic resin composition, polyisocyanate composition, binder composition, aggregate, or foundry mix. The particular additives chosen will depend upon the specific purposes of the formulator.

The molding mix is molded into the desired shape, whereupon it can be cured by the so called cold box process at ambient temperature. Curing can be affected by passing a tertiary amine through the molded mix such as described in U.S. Pat. No. 3,409,579.

However, it has been found that curing with a liquid urethane-promoting catalyst according to the so called no-bake process enables one to obtain higher tensile strengths at a lower solid levels of the phenolic resin composition. Generally, the liquid curing catalyst is added directly to the phenolic resin composition.

The catalyst employed in the no-bake process is a base having a $pK_b$ value in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherei the alkyl group has from 1 to 4 carbon atoms, isoquinoline, aryl-pyridines such as phenyl pyridine, pyridine, acridine, 2-methoxypyridine, pyridazine, 3-chloro pyridine, quinoline, N-methyl imidazole, 4,4-dipyridine, phenyl-propyl pyridine, 1-methylbenzimidazole, and 1,4-thiazine.

In view of the varying catalytic activity and varying catalytic effect desired, catalyst concentrations will vary widely. In general the lower the $pK_b$ value is, the shorter will be the bench life of the composition and the faster, more complete will be the cure. Solvents and any acidity present in added ingredients such as sand may affect the catalytic activity. In general, however, catalyst concentrations will range from 0.01 to 10 percent by weight of the phenolic resin.

EXAMPLES

The examples which follow will illustrate specific embodiments of the invention. These examples along with the written description will enable one skilled in the art to practice the invention. It is contemplated that many equivalent embodiments of the invention will be operable besides these specifically disclosed.

The phenolic resin (abbreviated as PR) used in all of the examples was a resin containing a polymeric material having a preponderance of bridges joining its phenolic nuclei which are ortho-ortho benzylic ether bridges. The resins were prepared by reacting a molar excess of paraformaldehyde with phenol at elevated temperatures in the presence of a divalent metal catalyst. The procedures for preparing such resins are set forth in U.S. Pat. No. 3,485,797.

The solvents and amounts used with the resin are set forth in Table I and are abbreviated as follows:

CA = Cellosolve Acetate
PGMA = Propylene glycol mono methyl ether acetate
BA = Butyl Acetate
AHS = HI-SOL 15, an aromatic hydrocarbon solvent The polyisocyanate composition used in the examples contained about 60 percent by weight of polymethylene polyphenyl isocyanate having a functionality of 2.9 and about 40 percent of HI-SOL 15, an aromatic hydrocarbon solvent.

The catalyst used was 4-phenylpropylpyridine which was diluted to a 25 percent by weight concentration in an aromatic hydrocarbon solvent.

The general procedure used in the examples was to add three parts by weight of the catalyst solution to 100 parts by weight of the phenolic resin composition (which contained the solvent), said parts by weight being based upon the weight of the resin composition. Then 0.825 parts by weight of resin composition containing the catalyst solution was uniformly mixed with 100 parts of Wedron 540 sand, said parts by weight being based upon the weight of the sand. After mixing, 0.675 parts of the polyisocyanate composition was added to the sand and resin mixture, and uniformly distributed therein.

The resulting foundry mix was formed into standard AFS tensile test samples according to standard procedures. Measuring the tensile strength of the dog bone samples enables one to predict how the mixture of sand and polyurethane-forming binder will work in actual foundry operations.

In the examples which follow, the tensile strengths were measured 1 hour, 3 hours, and 24 hours after curing at ambient conditions in closed containers. The dog bone samples that were tested 24 hours after curing were stored at a relative humidity of 50% and a temperature of 25° C. They were also measured 24 hours after curing after being exposed to a relative humidity (RH) of 100%. Tensile strengths at these times are given in Table I.

All weights in the examples are given in parts by weight.

EXAMPLE I

Example I illustrates that acceptable tensile strengths can be obtained using 20pbw of PGMA and 50pbw of base resin.

Comparison Examples A and B indicate that lower tensile strengths are obtained if CA and BA are used under similar conditions.

EXAMPLE 2

Example 2 illustrates that effective tensile strengths are obtained if higher solids content is used in the formulation.

Comparison Examples C and D again show that PGMA is more effective than either CA or BA in providing higher tensile strengths in the formulation tested.

EXAMPLES 3-6

These examples illustrate the effect of varying the solids level in the phenolic resin composition. Acceptable tensile strengths can be obtained even at a solid level of 45 percent in the phenolic resin component.

TABLE I

| EXAMPLE | Phenolic Resin Composition | | | | | Tensile Measurements (Psi) | | | 0 + 24 |
|---|---|---|---|---|---|---|---|---|---|
| | PR | PGMA | CA | BA | AHS | 1 HR | 3 HR | 24 HR | 100% RH |
| 1 | 50 | 20 | — | — | 30 | 227 | 291 | 290 | 41 |
| Comparison A | 50 | — | 20 | — | 30 | 183 | 247 | 283 | 38 |
| Comparison B | 50 | — | — | 20 | 30 | 95 | 129 | 166 | 43 |
| 2* | 60 | 15 | — | — | 25 | 199 | 272 | 275 | 43 |
| Comparison C | 60 | — | 15 | — | 25 | 179 | 220 | 245 | 30 |
| Comparison D | 60 | — | — | 15 | 25 | 192 | 233 | 248 | 50 |
| 3 | 45 | 22 | — | — | 33 | 72 | 121 | 192 | 37 |
| 4 | 55 | 18 | — | — | 27 | 222 | 261 | 306 | 35 |
| 5 | 47 | 21 | — | — | 32 | 129 | 175 | 233 | 45 |
| 6 | 50 | 20 | — | — | 30 | 170 | 230 | 286 | 38 |

*Example 2 is not within the scope of the claims. Although high solids level will produce foundry shapes with adequate tensile strengths, these shapes will produce higher lustrous carbon when they are used to make castings.

I claim:

1. A phenolic resin composition comprising: a. a phenolic resin; and b. a solvent composition comprising:
   i. propylene glycol mono methyl ether acetate; and
   ii. an aromatic hydrocarbon solvent wherein the weight ratio of (a) to (b) is from 45:55 to 55:45, and the weight ratio of (i) to (ii) is from 1:2 to 2:1.

2. The phenolic resin composition of claim 1 wherein the phenolic resin is a resole resin prepared by reacting an aldehyde with a phenolic compound such that the molar ratio of aldehyde to phenolic compound is from 1.1:1.0 to 2.0:1.0.

3. The phenolic resin composition of claim 2 wherein the phenolic resin is prepared by reacting the aldehyde and phenolic compound in the presence of a divalent metal catalyst.

4. The phenolic resin composition of claim 3 wherein the phenolic compound is selected from the group consisting of phenol, o-cresol, p-cresol, and mixtures thereof.

5. The phenolic resin composition of claim 4 wherein the aldehyde is formaldehyde.

6. The phenolic resin composition of claim 5, wherein the weight of the phenolic resin is from 47:53 to 51:49 weight percent based upon the total weight of the phenolic resin composition.

7. A foundry binder comprising in admixture:
a. the phenolic resin composition of claim 1;
b. a polyisocyanate composition.

8. The foundry binder of claim 7 wherein the phenolic resin composition contains a liquid urethane promoting curing catalyst.

9. The foundry binder of claim 8 wherein the phenolic resin is a resole resin prepared by reacting an aldehyde with a phenolic compound such that the molar ratio of aldehyde to phenolic compound is from 1.1:1.0 to 2.0:1.0.

10. The foundry binder of claim 9 wherein the phenolic resin is prepared by reacting the aldehyde and phenolic compound in the presence of a divalent metal catalyst.

11. A foundry mix comprising:
a. a major amount of foundry aggregate
b. an effective bonding amount of the foundry binder of claim 7.

12. The foundry mix of claim 11 wherein said foundry binder is the foundry binder of claim 8.

13. A foundry binder comprising in admixture:
a. the phenolic resin composition of claim 6; and
b. a polyisocyanate composition.

14. The foundry binder composition of claim 13 wherein the phenolic resin composition contains a liquid urethane promoting curing catalyst.

* * * * *